Dec. 30, 1930. J. P. MORRIS 1,787,208
MACHINE FOR CUTTING BIAS FABRICS
Filed July 23, 1927 4 Sheets-Sheet 1
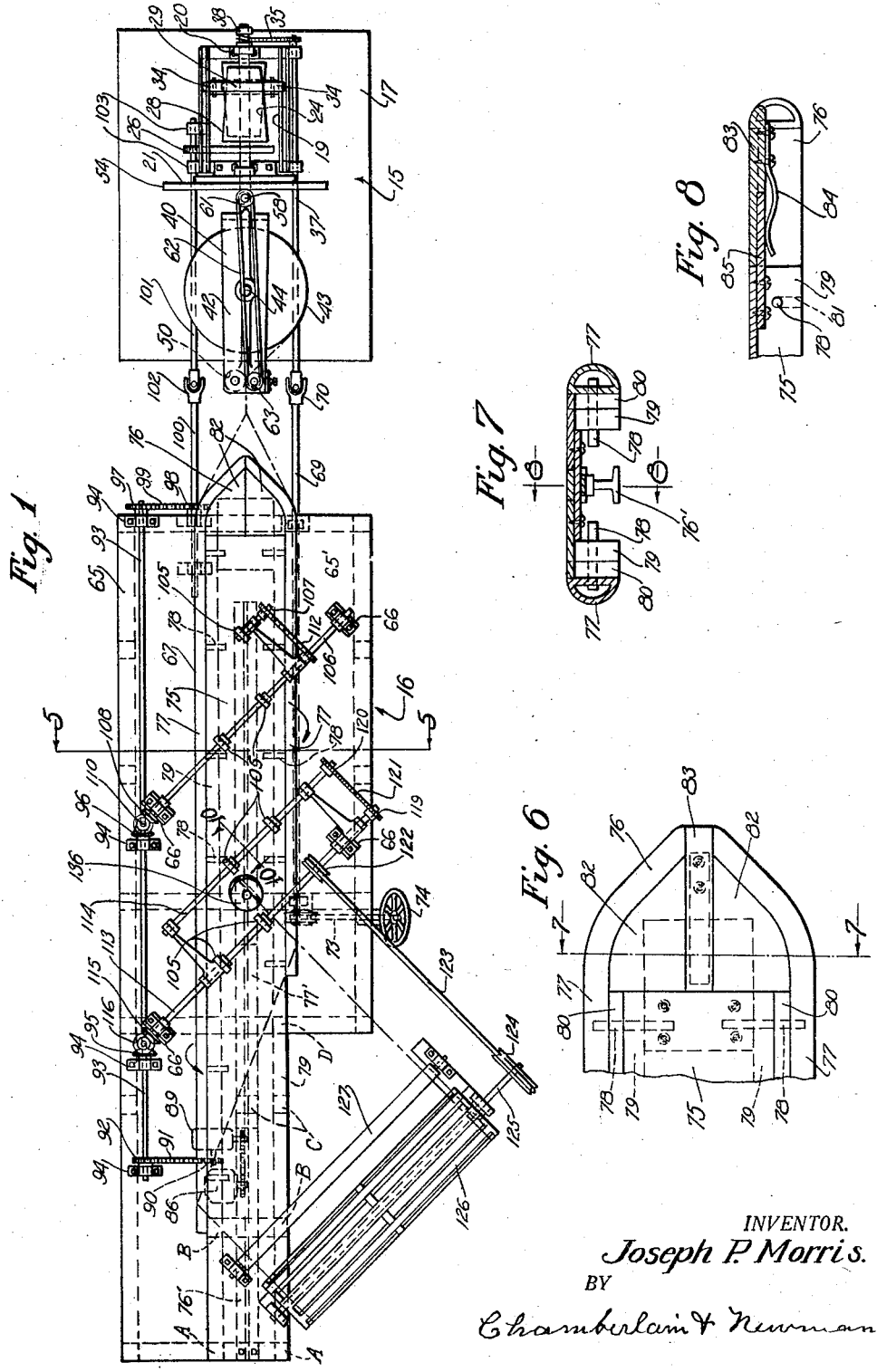
INVENTOR.
Joseph P. Morris.
BY
Chamberlain & Newman Dec. 30, 1930.    J. P. MORRIS    1,787,208
MACHINE FOR CUTTING BIAS FABRICS
Filed July 23, 1927    4 Sheets-Sheet 2
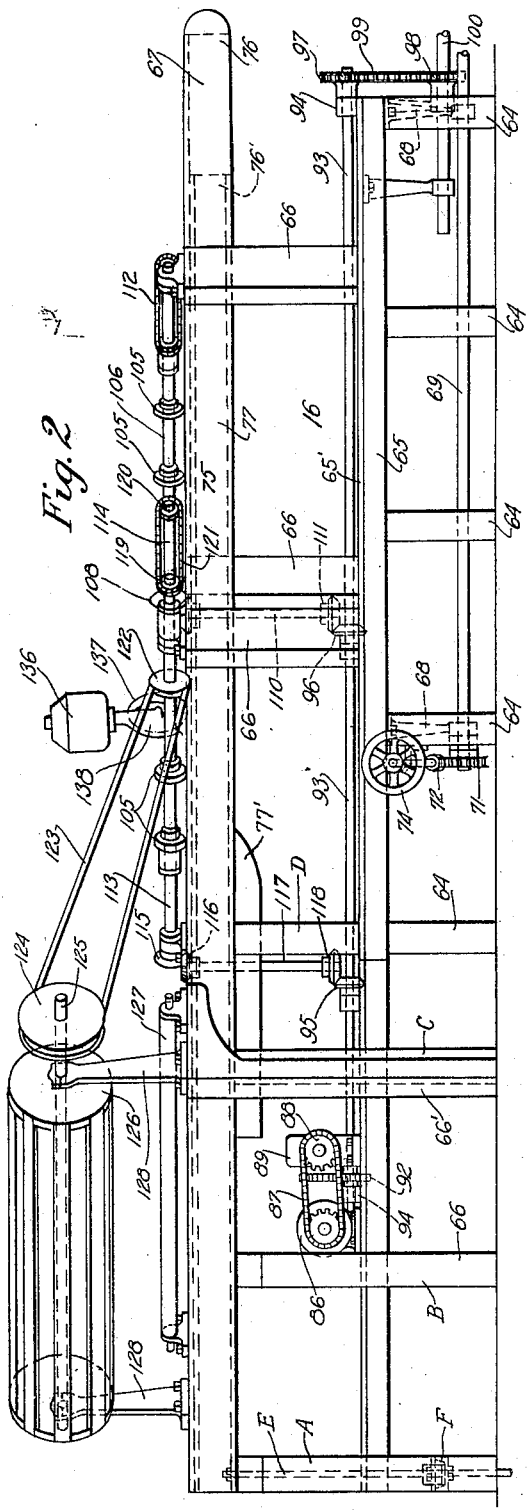
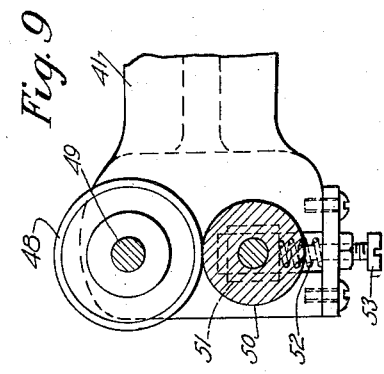
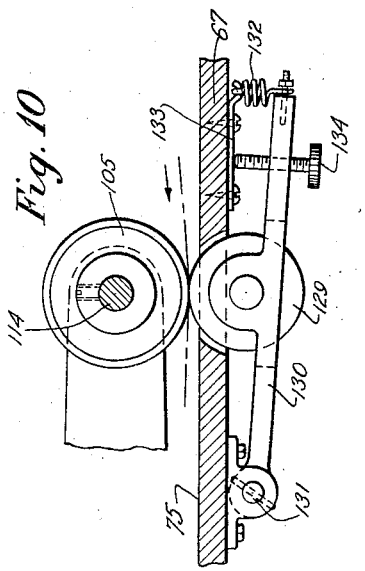
INVENTOR.
Joseph P. Morris.
BY
Chamberlain & Newman
ATTORNEYS.

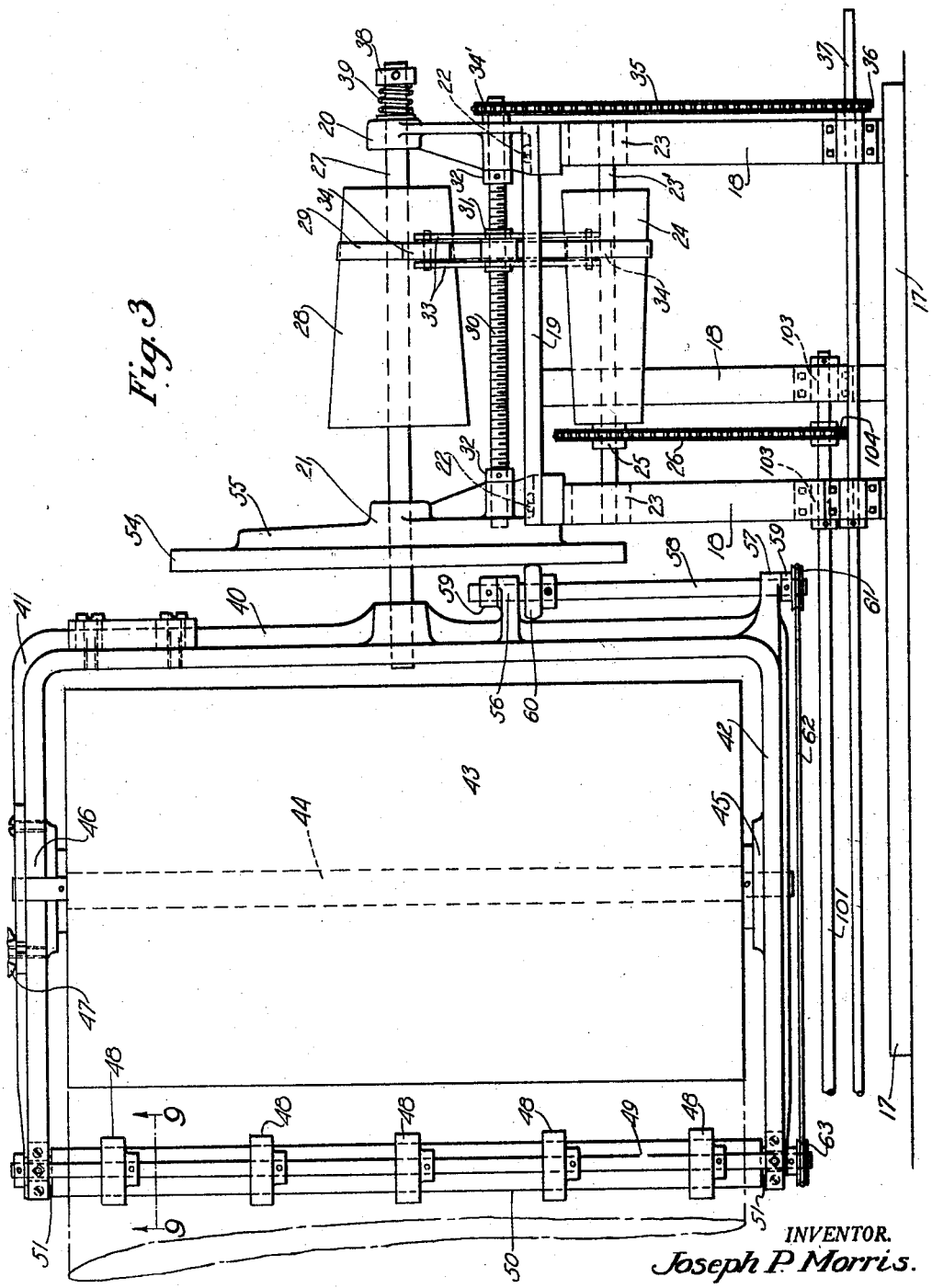

Dec. 30, 1930.　　　J. P. MORRIS　　　1,787,208
MACHINE FOR CUTTING BIAS FABRICS
Filed July 23, 1927　　　4 Sheets-Sheet 4
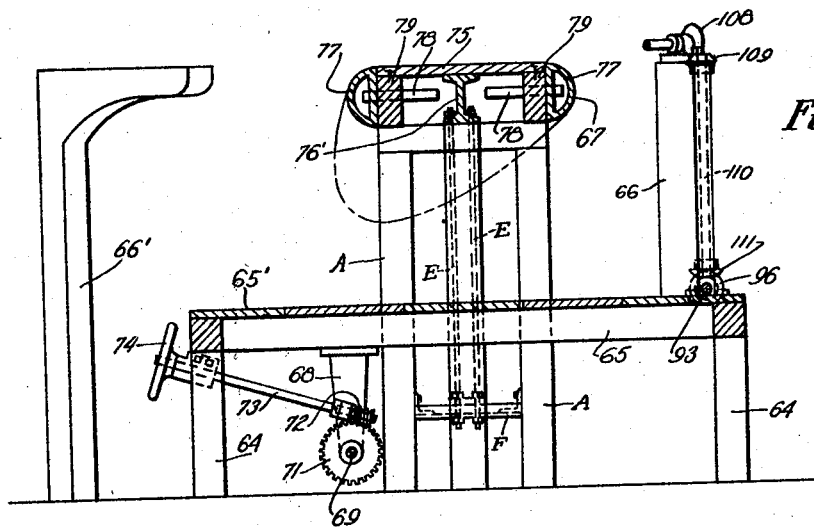
Fig. 5
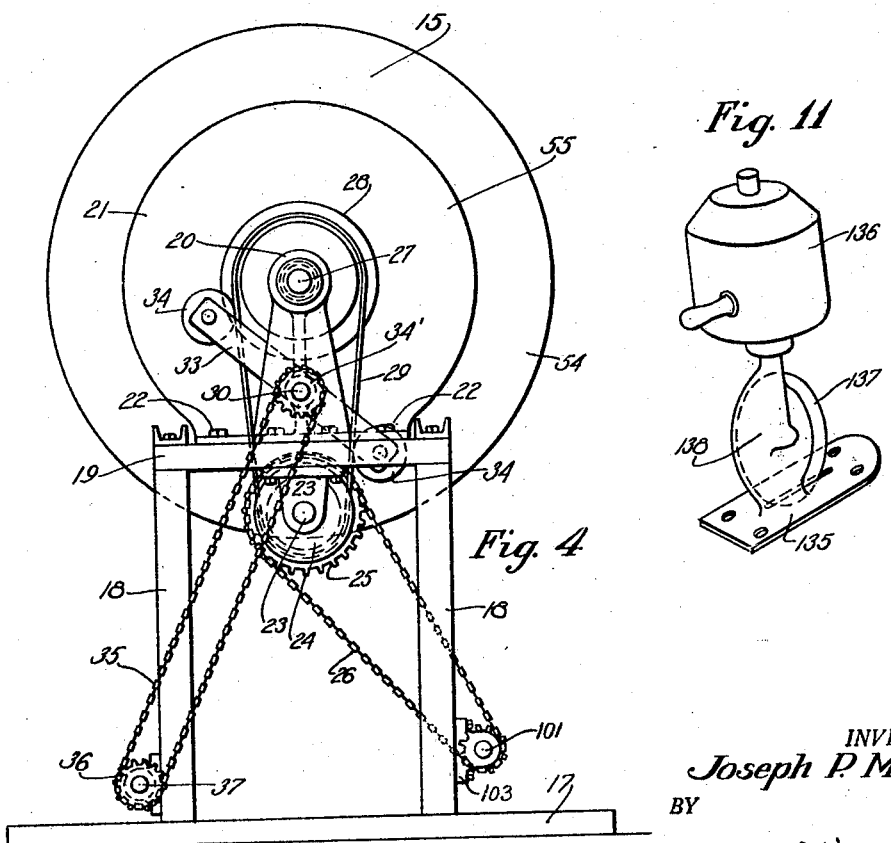
Fig. 11
Fig. 4
INVENTOR.
Joseph P. Morris.
BY
Chamberlain & Newman Patented Dec. 30, 1930

1,787,208

UNITED STATES PATENT OFFICE

JOSEPH P. MORRIS, OF BRIDGEPORT, CONNECTICUT

MACHINE FOR CUTTING BIAS FABRICS

Application filed July 23, 1927. Serial No. 207,858.

This invention relates to means for spirally cutting a sewed or woven tube of cloth into a continuous length to form a bias fabric of even width throughout, in which both the warp and weft are disposed at angles other than 90° with the cut edge.

Bias strips, so formed are used for bindings in wearing apparel; as insulations in electrical conductors; in the manufacture of automobile tires; buffing and polishing wheels; surgical tapes and the like.

An object of this invention is to provide an improved apparatus whereby a cloth tube will be transformed or cut into a continuous bias strip of uniform character and width, it being but necessary to start the cloth tube through the machine which will cut it as desired and deliver it without distortion ready for further manufacture.

A further object of this improved machine is to provide greater scope in respect to the widths of tubular fabric which may be cut, i. e. The same machine may be used to produce from a minimum width of cloth tube to a maximum width of twice the minimum width. Also to provide a machine of this type having a constant delivery speed, with only slight tension in feeding and likewise only slight tension and no distortion in delivery.

An additional feature is to provide a machine, as above stated, in which the speed of unwinding or feeding the tubular fabric may be varied to take care of different widths of tubing to be cut, easily manipulated means being provided for varying the speed.

An additional object is to provide improved means for feeding the cloth through the machine, whereby no great tension is placed on the cloth tube before it is cut, or the bias strip after it is cut, although the cloth is maintained fairly taut at the cutting point.

Another object is to provide a machine, as above stated, with certain adjustable features looking to the convenient handling of cloth tubes of different widths or diameters.

Additional objects and advantages will become apparent from the following description, taken in connection with the accompanying drawings, wherein Fig. 1 is a plan view of the complete machine;

Fig. 2 is a side elevation of the cutting section of the machine;

Fig. 3 is an enlarged view of the batch roll, supporting and feeding means;

Fig. 4 is an end elevation view, looking from the right in Fig. 1;

Fig. 5 is a cross sectional view of the machine, taken on the line 5—5 of Fig. 1, part of the mechanism being omitted.

Fig. 6 is an enlarged fragmentary plan view of the forward end of the mandrel, showing the same adjusted to a new width;

Fig. 7 is a sectional view, on the line 7—7 of Fig. 6;

Fig. 8 is a sectional view, on the line 8—8 of Fig. 7;

Fig. 9 is a sectional view, on the line 9—9 of Fig. 3;

Fig. 10 is a sectional view, on the line 10—10 of Fig. 1; and

Fig. 11 is a perspective view of the cutter, showing the same removed from the machine.

Referring in detail to the drawings, wherein for the purpose of illustration there is shown a preferred embodiment of the invention, it will be noted that the machine comprises a feeding section 15 and a carrying, cutting and delivering section 16. The feeding section of the machine comprises a base 17, provided with uprights 18 on which is supported the framework 19. This framework has mounted thereon a rear bearing bracket 20 and a forward bracket 21, the brackets being secured in place as by means of bolts 22.

Journaled in hangers 23 secured to the underside of the frame 19 is a shaft 23' carrying a cone pulley 24 driven through a sprocket 25, by means of a chain belt 26. It will, of course, be understood that other suitable means for transmitting power to the shaft may be employed.

Journaled in the brackets 20 and 21 is a shaft 27, also mounting a cone pulley 28, the cone pulley 28 being in reverse position as regards the pulley 24.

A belt 29 is employed for delivering power from the pulley 24 to the pulley 28, and suitable means are provided for shifting the belt on the pulleys to increase or decrease the speed of the shaft 27. Such means in the embodiment shown, comprises a threaded shaft 30 journaled in the brackets 20 and 21, and having mounted thereon a nut 31. Threaded shaft 30 is mounted for rotary movement, and is held against longitudinal movement by means of the collars 32, one of which is disposed at the inner side and in abutting relation with each of the brackets 20 and 21.

Carried by the nut 31 are a pair of arms 33, and journaled between the outer ends of these arms are rollers 34, adapted to hold the belt taut on the pulleys. Rotation of threaded shaft 30 will result in feeding the nut 31 along the shaft in a direction determined by the rotation of the shaft. This, of course, will result in similar movement of the arms 33, which will move the belt with them and thereby effect the speed at which the pulley 28 is driven by the pulley 24. To increase the speed at which pulley 28 is driven, shaft 30 would be rotated so as to feed the nut 31 toward the right in Fig. 3, and to decrease the speed, rotation would be in the opposite direction.

Means are provided for rotating the shaft 30, which means includes a sprocket 34' secured to the outer end of the shaft, and rotated by means of a sprocket chain 35. Sprocket 36 on a relatively long shaft 37 is used for supplying power to the chain 35 in order that the shaft 30 may be rotated to vary the speed of the pulleys. The means for rotating shaft 37 will later be described.

Mounted on the forward end of the shaft 27, which end projects beyond the casting 21, is an unwinding creel 40, which is shown in Fig. 3 as substantially U-shape, and comprises a pair of arms 41 and 42.

The cloth to be cut into a bias width comes in the form of a batch roll, mounted upon a paper tube. Such a roll being shown at 43, mounted on a mandrel 44, supported in journals 45 and 46 in the unwinding creel. The journal 46 is adapted to be opened to permit of the convenient insertion of the mandrel and batch roll carried thereby, and when the mandrel and batch roll are so positioned, the journal is swung closed and secured as by means of a bolt and wing nut 47.

Since the unwinding creel is secured to shaft 27, it will be readily apparent that any movement of this shaft, due to power applied to the same by the cone pulleys and belt, will result in a turning movement of the creel. Further, the mandrel 44 being journaled in the creel, is free for turning movement.

In the operation of the device, the unwinding creel is rotated in a clockwise direction on the horizontal shaft 27, and in addition, the batch roll mandrel provides an axis of rotation. The result of these two movements produces a spiral unwinding of the cloth tube in the direction and with the helix on a level with a tube cutting mandrel later to be described.

Mounted between the forward ends of the arms 41 and 42 of the unwinding creel is a series of rubber-covered take-off rolls 48, the same being mounted on a driven shaft 49 journaled in the said forward ends of the arms 41 and 42. These rolls are in contact with a solid spring-mounted idler roll 50, see Figs. 3 and 9. The ends of the idler roll are yieldably mounted in journals 51, cushioned by the springs 52, which springs are held in place by means of a screw, or the like, 53. The spring mounting of the idler roll produces a contact, or nip, for the cloth tube. Also, the driven rolls 48 are larger in diameter than the idler roll, and this also increases the contact or nip.

The bracket 21 has an extended disk like portion which forms a stationary planetary member 54. Also, this bracket includes a reinforcing back portion 55, smaller in diameter, and immediately in the rear of the member 54. Mounted in bearings 56 and 57 on the unwinding creel 40, is a shaft 58. This shaft is mounted for rotary movement, and is held against longitudinal movement by means of a pair of collars 59 keyed thereto. Adjustably mounted on shaft 58, and in contact with the stationary planetary member 54 is a small friction disc roll 60. It will be apparent that during rotation of the unwinding creel, this roll will, due to its contact with the planetary member 54, impart a turning movement to the shaft 58.

Secured to the outer end of shaft 58, so as to turn therewith, is a pulley 61, which through a belt 62 serves to rotate a similar pulley 63 secured to one end of the shaft 49 upon which the rubber-covered take-off rolls 48 are mounted. Should it be desired to increase the speed of the rubber-covered take-off rolls, it is but necessary to adjust the friction disc 60 outwardly along the shaft 58 to the larger diameter of the stationary planetary. A reverse movement in the direction of adjustment of the friction disc 60 will, of course, decrease the speed at which the take-off rolls are driven.

The rear end of the shaft 27 projects beyond the bracket 20, and disposed between the bracket and a collar 38 is a coil spring 39. This spring at its respective end bears against the bracket and collar 38, and normally tends to exert a pull on the shaft 27 to maintain the friction disc 60 in firm engagement with the planetary member 54.

The cutting section 16 of the machine is shown as being constructed principally of wood, though it will be obvious that it can be made of iron or steel, in which case doubtlessly slight changes in the form and arrangement of the respective parts would be made. As illustrated the machine includes uprights 64 which support a frame 65 that has a covering or platform which is positioned above the floor and extends through the framework for the upper portion of the machine, and along opposite sides thereof. This framework and platform serves to support various operative parts of the machine including brackets 68 in which is journaled a longitudinally disposed shaft 69. This shaft as best shown in Fig. 1, is connected with the shaft 37 by means of a universal joint 70. Owing to the employment of the universal joint the connected shafts may be driven one from another even though the sections 15 and 16 be not perfectly aligned in setting up the machine.

67 represents a mandrel around which the tubular fabric to be cut is spirally fed, and is constructed and supported so as to provide a relatively long projected free end portion to receive, support and guide the tubular fabric to the cutter. This mandrel is clearly shown in Figs. 1, 2 and 5 and as will be noted comprises a body portion 75 and a front end or head portion 76. The mandrel is mounted on supports A, B, C and D all of which are positioned under the rear end portion, back of the cutter 136. This mandrel as constructed includes a long arm portion that projects forward unsupported except as by means of the posts referred to, and in order to stiffen and more rigidly support this extended portion I include in its construction a longitudinal centrally disposed I-beam 76' which is in part supported on a reinforced member 77' mounted beneath the mandrel and supported between it and the top and central post C. At the rear end of the machine is provided tie rods E E, the upper ends of which are connected to the lower flange portions of the I-beam 76' and the lower threaded end portions secured to a cross member F, the ends of which are fastened to the post A A. It will thus be seen that by means of the nuts mounted upon the threaded ends of the tie rods E the rear end of the mandrel can be drawn down and securely supported so as to hold the projected forward end in proper alignment to receive the tubular cloth as fed from the creel.

Means are provided for rotating the shaft 69, and this means comprises a worm gear 71 keyed to the shaft, and a worm 72 secured to a shaft 73 adapted to be rotated by means of a hand wheel, or the like, 74. Rotation of the hand wheel 74 in one direction serves to shift the belt 29 to increase the speed at which the pulley 28 is driven, and rotation of the hand wheel in the opposite direction serves to decrease the speed at which said pulley is driven.

In the operation of the machine, the tubular fabric to be cut is fed along spirally about the mandrel, and to provide for the accommodation of cloth tube of different widths, the mandrel is adjustable so as to increase its lateral dimension. To this end, the side members 77 of the mandrel are connected to the body portion thereof by means of pins 78. These pins are slidably received in the longitudinal frame 79 of the mandrel so that when the side members are moved outwardly from the body portion of the mandrel the pins will be partly withdrawn through said frame 79. With the side member 77 spaced from the frame member 79, fillers 80 may be dropped into place. These fillers are provided with vertical slots, as shown at 81 in Fig. 8, and through the employment of said slots and the pins as described, the fillers may be simply dropped into place, it not being necessary to completely disconnect any parts of the mandrel.

The fillers 80, above described, serve to close the upper surface of the body portion of the mandrel when the same has been increased in width for the purpose stated.

In connection with the front end or head portion of the mandrel, it is to be noted that the blocks 82 are movable with the side members of the mandrel so that when the mandrel is adjusted, a space is provided between these blocks. I have provided a filler for this space, the same comprising a strip 83 carrying on its under side a leaf spring 84 adapted to frictionally engage the under side of a plate 85 carried by the mandrel for this purpose. The action of the spring 84 is such as to clamp the strip 83 against the plate 85 so as to maintain the same in proper position, and yet permit of its ready insertion and removal as required.

Mounted on the platform 65' is a suitable source of supply of power, shown as an electric motor 86. This motor through a chain or belt 87 drives a sprocket or pulley 88, and through suitable speed reducing gearing in a housing 89, the power is delivered to a sprocket 90, which through a chain belt 91 and a sprocket 92 drives a line shaft 93. The line shaft is mounted in suitable bearings 94 on the platform 65', and is provided at spaced points with bevelled pinions 95 and 96, for a purpose to be later described. A sprocket 97 is secured to the end of the shaft 93 and is connected by a sprocket chain 99 with and to drive a similar sprocket 98 upon a shaft 100.

Shaft 100, as best shown in Fig. 1, is connected with a shaft 101 by means of a universal joint or other flexible coupling 102. Shaft 101 is journaled in bearings 103 carried by a pair of the uprights 18 of the feeding section of the machine. This shaft has keyed to it a sprocket wheel 104, through the medium of which the shaft drives the chain 26 for the purpose of rotating the driving cone pulley 24. The flexible coupling 102 between the shafts 100 and 101 is employed, since such coupling will permit of the proper coupling up of the machine even though the sections 15 and 16 be not in absolute alignment.

Owing to the feeding of the material from the unwinding creel as already described, it is fed to the mandrel in a spiral, and to feed the material along and spirally about the mandrel, two sets of diagonally disposed feed rolls 105 are provided. These feed rolls are obviously set parallel to the rotary cutter and feed the cloth tube in a direction parallel to the line of cutting. The first set being mounted on shafts 106 and 107 which are arranged diagonally of, and extended across the top of the mandrel. The end portions of said shafts being journaled in bearings supported on the upper end portions of posts 66. The shaft 106 being driven by means of a bevelled pinion 108, which in turn is driven by a bevelled pinion 109 on the upper end of a vertical shaft 110. Vertical shaft 110 secures its power through the medium of a bevelled pinion 111 which meshes with the bevelled pinion 96 on the line shaft 93. The shaft 107 is driven from shaft 106 through the medium of a sprocket chain 112 disposed about suitable sprockets on these shafts. The second set of feed rolls are mounted on shafts 113 and 114, similar to the shafts 106 and 107. As in the case of the shaft 106, the shaft 113 is driven through bevelled pinions 115 and 116 mounted respectively on the end of shaft 113 on the upper end of a vertical shaft 117. Shaft 117 is driven through the medium of a bevelled pinion 118 in mesh with the pinion 95. Also, shaft 113 drives shaft 114 through the medium of suitable sprockets 119 and 120, and a sprocket chain 121.

A pulley 122 is secured to the shaft 113 to turn therewith and through the medium of a belt 123 drives a pulley 124 secured to a shaft 125 which mounts a reel 126 which delivers the bias cut fabric without tension or distortion clear of the machine for further manufacture, i. e., re-rolling or re-cutting to various widths. A guide roll 127 is provided to guide and slightly tension the fabric whereby the same is smoothly although not tightly guided to the reel 126.

A reel 126 and the guide roll 127 are journaled in bearings of brackets 128 and mounted upon the mandrel and a support 66' respectively. The reel is driven at a greater surface speed than the cut fabric which lays over and is supported thereon. This causes a wiping action which keeps the cloth clear of the machine but with no undue tension or distortion.

In connection with each of the driven feed rolls 105, a spring-pressed idler roll 129 is employed. A detail of this is shown in Fig. 10, and it will be noted that the idler 129 is journaled by means of a member 130 pivoted as at 131 to the under side of the body of the mandrel. The idler projects up through an opening in the mandrel so as to insure contact between the driven feed roll 105 and the material being cut. The spring 132 is connected at one end to the free end of the member 130, and at its other end is secured to a plate 133 disposed on the under side of the body of the mandrel. For the purpose of adjusting the pressure exerted by the idler 129, a screw 134 is provided. This screw passes through the member 130 near the free end thereof and has contact with the plate 133.

The cutter, which is an electrically driven unit, and which may be of any preferred type, is mounted on the mandrel by means of a base 135, and comprises an electric motor 136 adapted to drive a rotary disc cutter 137 through suitable miter gearing enclosed within the knife support and guard 138. The diagonal mounting of this cutter is parallel to the feed rolls and produces a line of cutting parallel to the line of feeding. This cutter may be driven at a greater speed than the surface speed of the cloth tube, and rotates in the same direction. Further, the cutter works in a diagonal slot in the mandrel. The cutter in the drawings is shown as disposed between the feed rolls on the shafts 113 and 114, this being the preferred position of the cutter, although it will be understood that the position of the cutter may be varied somewhat. Further, it will be understood that while I have shown two sets of feed rolls, additional rolls may be employed if desired, or some of the rolls may be dispensed with.

The only time the speed of the unwinding creel is changed is when the width of the tube to be cut is changed, and such change is made to conform with the speed of the diagonally positioned feed rolls mounted above the cutting mandrel. An increase in speed is readily accomplished by shifting the belt 29 to the smaller diameter of the pulley 28, by operating the hand wheel 74 as before described. Also, change in speed of the rubber-covered take-off rolls is necessary when the width of the tube to be cut is changed. Such change in the speed of these rolls is easily accomplished by manually shifting the position of the small friction roll 60 in the manner already described.

In the operation of the device, the cutter is started and the mechanism for unwinding and feeding the tube is put into motion. The unwinding creel rotates and the feed roll is unwound by means of the take-off rolls 48. There is no tautness between the take-off rolls 48 and the first set of feed rolls 105, although the cloth tube to be cut is fairly taut between the first feed roll and the point at which the cutting occurs. After the bias web leaves the cutter, no tension is exerted on the fabric.

By reference to the drawings, and particularly to Fig. 5, it will be noted that the tube does not snugly fit the mandrel at any point except as it is caused to so fit by its own weight, and the drag produced in drawing the tube spirally around the mandrel. This drag, it will be noted is (referring to Fig. 5), on the right side and against the edge from which the cloth is being drawn by the feed rolls.

The adjustment of the mandrel so as to increase the lateral width of the same is only necessary to keep the tube from making too deep an ellipse, which would result in the cloth tube being dragged on the floor or other surface and becoming soiled.

While I have shown and described a preferred and satisfactory embodiment of my invention, it is to be understood that the description and drawings are purely by way of illustration, and that minor changes in the construction and arrangement of parts may be resorted to without departing from the spirit of the invention or scope of the appended claims, to which reference must be had for a definition of the limitations of the invention.

Having thus described my invention, what I claim is:

1. In a machine for cutting a cloth tube into a bias strip, a flat mandrel, means for spirally feeding the cloth tube in the direction of the mandrel, rolls disposed on top of the mandrel for feeding the cloth tube along and spirally about the mandrel, means for cutting the cloth tube into a bias strip as it is fed, and means for moving the bias strip from the cutter.

2. In a machine for cutting a cloth tube into a bias strip, a flat mandrel, means for spirally feeding the cloth tube around the mandrel, said means comprising rolls diagonally disposed on top of the mandrel for feeding the cloth along and spirally about the mandrel, spring-pressed idler rolls co-operating with said feed rolls to produce a nip for the cloth tube and means for cutting the cloth tube into a bias strip as it is fed.

3. In a machine for cutting a cloth tube into a bias strip, a flat mandrel, means for spirally feeding the cloth tube around the mandrel, said means comprising feed rolls diagonally disposed on top of the mandrel for feeding the cloth tube along and spirally about the mandrel, means for driving said rolls, means for cutting the cloth tube into a bias strip as it is fed, a reel for moving the bias strip from the cutter, and spring-pressed idler rolls co-operating with the feed rolls to produce nip for the cloth being fed.

4. In a bias fabric cutting machine, a cloth tube feeding means, including an unwinding creel, take-off rolls carried thereby, means for rotating the creel, an elongated mandrel in alignment with the creel, a cutter mounted on the mandrel, a series of shafts diagonally arranged with respect to the length of the mandrel, feed rolls mounted on the shafts for feeding the cloth diagonally across the top face of the mandrel to the cutter, and means for operating said shafts simultaneously at a uniform rate of speed.

5. The combination with an unwinding creel for supporting and feeding a cloth tube, of a mandrel positioned to receive the cloth tube from said creel, a cutter mounted on the mandrel, a shaft positioned diagonally above the mandrel, arms hinged to the shaft, a second shaft journaled in bearings of the arm, feed rolls mounted upon said shafts, means for operating the said shafts and rolls to feed the cloth tube spirally around the mandrel to the cutter, and means for conveying the cut cloth from the cutter.

Signed at Bridgeport, in the county of Fairfield and State of Connecticut, this 14th day of July, A. D. 1927.

JOSEPH P. MORRIS.